US007937971B2

(12) United States Patent
Costello, III et al.

(10) Patent No.: US 7,937,971 B2
(45) Date of Patent: May 10, 2011

(54) METHODS FOR DRAWING OPTICAL FIBERS USING A FLUID BEARING

(75) Inventors: John Joseph Costello, III, Lake Elmo, MN (US); James Henry Faler, Wilmington, NC (US); Andrey V Filippov, Painted Post, NY (US); Steven Joseph Gregorski, Painted Post, NY (US); Bruce Warren Reding, Wilmington, NC (US); John Christopher Thomas, Elmira, NY (US)

(73) Assignee: Corning Incorporated, Corning, NY (US)

( * ) Notice: Subject to any disclaimer, the term of this patent is extended or adjusted under 35 U.S.C. 154(b) by 771 days.

(21) Appl. No.: 11/986,764

(22) Filed: Nov. 26, 2007

(65) Prior Publication Data
US 2010/0281922 A1    Nov. 11, 2010

Related U.S. Application Data

(60) Provisional application No. 60/861,587, filed on Nov. 28, 2006.

(51) Int. Cl.
*C03B 37/02* (2006.01)
(52) U.S. Cl. ............. 65/435; 65/486; 65/533; 65/535; 65/538

(58) Field of Classification Search .............. 65/381, 65/435, 486, 533, 535, 538
See application file for complete search history.

(56) References Cited

U.S. PATENT DOCUMENTS

| 4,889,546 A | 12/1989 | Denniston ............... 65/5 |
| 5,042,899 A | 8/1991 | Le Compte ........... 385/134 |

FOREIGN PATENT DOCUMENTS

| DE | 37 07 969 A1 | 9/1988 |
| EP | 0493679 A2 | 7/1992 |
| JP | 59-146948 | 2/1983 |
| JP | 62-3037 | 6/1985 |
| JP | 04-265254 | 2/1991 |
| JP | 2001-141583 | 11/1999 |

OTHER PUBLICATIONS

Abstract of JP4265254A, S. Katsumi, et al., Device for Producing Optical Fiber, Feb. 19, 1991.
Abstract of JP59-146948, Nakahara Motohiro, et al., Drawing Method of Optical Fiber, Feb. 8, 1983.

*Primary Examiner* — Queenie Dehghan
(74) *Attorney, Agent, or Firm* — John L. Haack; Robert L. Carlson

(57) ABSTRACT

Methods for producing optical fibers along nonlinear paths include incorporating fluid bearings. An optical fiber is drawn from a preform along a first pathway, contacted with a region of fluid cushion of a fluid bearing, and redirected along a second pathway as the fiber is drawn across said region of fluid cushion.

21 Claims, 5 Drawing Sheets

FIG. 7
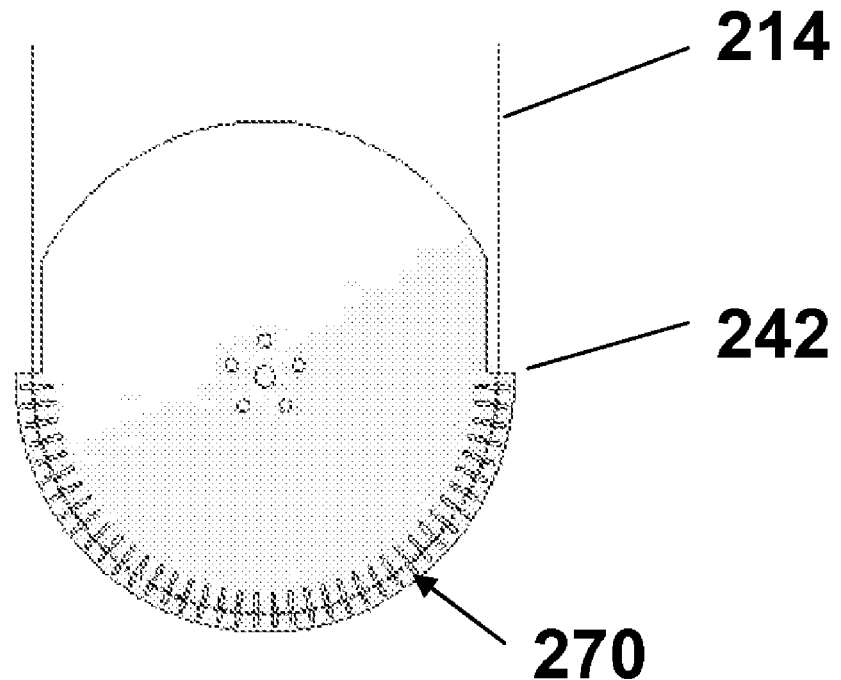
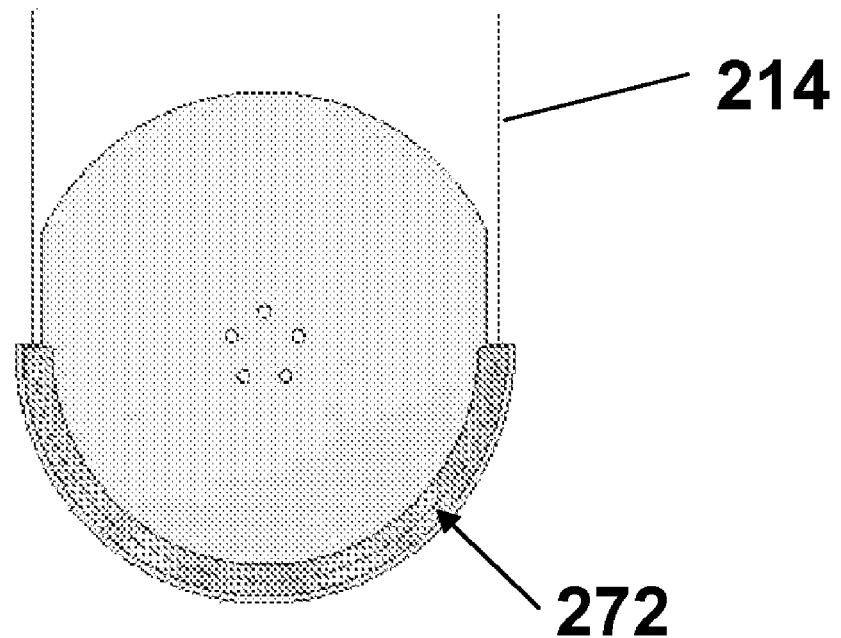
FIG 8

METHODS FOR DRAWING OPTICAL FIBERS USING A FLUID BEARING

CROSS-REFERENCE TO RELATED APPLICATIONS

This application claims the benefit of and priority to U.S. Patent Application No. 60/861587 filed on Nov. 28, 2006, the content of which is relied upon and incorporated herein by reference in its entirety.

FIELD OF THE INVENTION

This invention relates to methods for producing optical fibers along nonlinear pathways during the manufacture of such optical fibers. More particularly, the invention relates to optical fiber production methods incorporating fluid bearings.

BACKGROUND OF THE INVENTION

Conventional techniques and manufacturing processes for producing optical fibers generally include drawing an optical fiber downwardly along a linear pathway through the stages of production. However, this technique provides significant impediments to improving and modifying production of the optical fiber. For example, the equipment associated with linear production of optical fibers is usually aligned in a top to bottom fashion thereby making it difficult to add or modify the process without adding height to the overall system. In some cases, addition to the linear production system requires additional construction to add height to a building housing (e.g., where the draw tower is at or near the ceiling of an existing building). Such impediments cause significant costs in order to provide modifications or updates to optical fiber production systems and facilities.

Providing systems and methods which allow a manufacturer to eliminate the need for linear only systems would significantly reduce costs of implementing modifications or updates. For example, by having a system which stretches horizontally (as opposed or in addition to vertically), it would be much easier and cost effective to provide additional components and equipment to the production system. In addition, such arrangements could provide more efficient process paths to enable the use of lower cost polymers, higher coating speeds and provide for an improved fiber cooling technologies.

SUMMARY OF THE INVENTION

The present invention is intended to address and obviate problems and shortcomings and otherwise improve the systems and methods for producing optical fibers.

To achieve the foregoing, one embodiment of the present invention includes a method for producing an optical fiber including drawing a bare optical fiber from a preform along a first pathway, contacting the bare optical fiber with a region of fluid cushion of a fluid bearing and redirecting the bare optical fiber along a second pathway as the bare optical fiber is drawn across the region of fluid cushion.

Another aspect of the invention includes a method for producing an optical fiber including drawing an optical fiber along a first pathway, contacting the optical fiber with a region of a fluid bearing, wherein the fluid bearing comprises a first plate having an arcuate outer surface, a second plate having a corresponding arcuate outer surface, wherein the corresponding outer surfaces are substantially aligned and form said region between the corresponding outer surfaces of the first plate and the second plate, wherein the region is configured to receive the optical fiber, and at least one opening passing through at least one of the first plate and the second plate and configured to provide fluid flow through the fluid bearing. The method further includes redirecting the optical fiber along a second pathway as the optical fiber is drawn across the region of fluid cushion.

Another aspect of the invention includes a method for producing an optical fiber including drawing an optical fiber along a first pathway, contacting the optical fiber with a first region of fluid cushion of a first fluid bearing, redirecting the optical fiber along a second pathway as the optical fiber is drawn across the first region of fluid cushion of the first fluid bearing, contacting the optical fiber with a second region of fluid cushion of a second fluid bearing and redirecting the optical fiber along a third pathway as the optical fiber is drawn across the second region of fluid cushion of second first fluid bearing. The method also includes coating the optical fiber with a coating layer.

In any of the aspects of the invention described herein, the fluid bearing preferably may comprise a channel for guiding said fiber as the fiber passes through said fluid bearing. The channel is preferably formed by two parallel or substantially parallel sidewalls which form a passage through which the fiber travels and is redirected. During the fiber draw operation, the fiber is preferably positioned and retained entirely within said channel and between the sidewalls and said cushion of fluid emitted through said channel from one end to the other end of said channel. Typically the fluid enters the channel at a point which is inside the arcuate path formed by the fiber passing through the fluid bearing, and exits the channel from a point which is outside the arcuate path of the fiber. Higher pressure which therefore exists below the fiber on the inside of the arcuate path, relative to the pressure outside the arcuate path formed by the fiber, levitates the fiber. The channel is preferably provided with a means for decreasing pressure inside the arcuate path as the fiber moves outwardly in the channel towards the outer side of the arcuate path. For example, the channel can be provided with a tapered channel such that as the fiber rises within the channel, the pressure below the fiber decreases. In some preferred embodiments, the channel is tapered at an angle and the width of the channel at the fluid inlet is less than the width of the slot at the fluid outlet.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 7 illustrates a cross sectional view of an alternative fluid bearing design.

FIG. 8 illustrates a cross sectional view of another alternative fluid bearing design.

Figure 1:
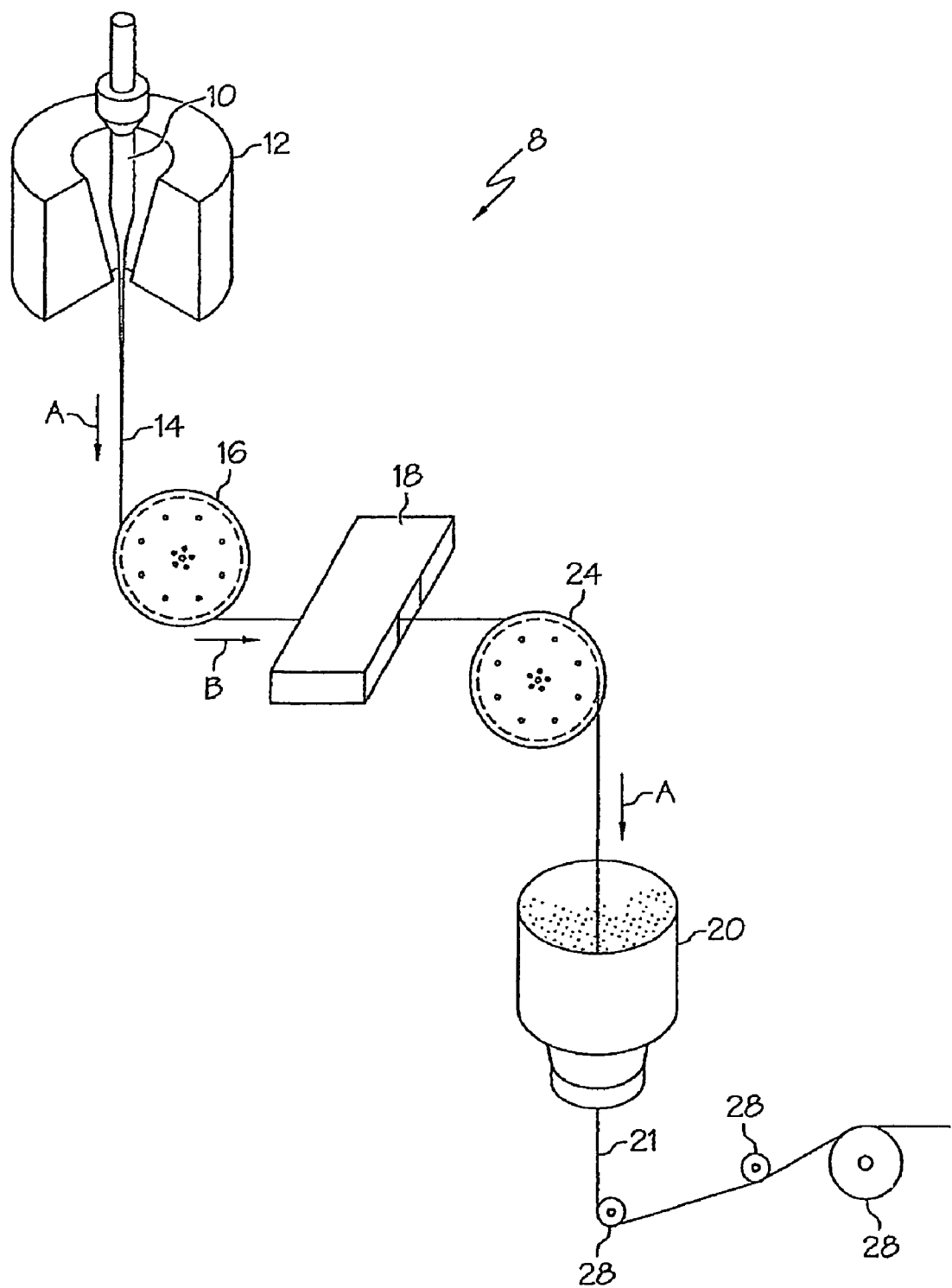
FIG. 1 illustrates an optical fiber production system.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

Reference will now be made in detail to the present preferred embodiment(s) of the invention, an example of which is/are illustrated in the accompanying drawings. Whenever possible, the same reference numerals will be used throughout the drawings to refer to the same or like parts.

The invention provides new systems and methods for producing optical fibers along nonlinear paths through the use of fluid bearings. Embodiments of the present invention are herein described in detail in connection with the drawings of FIGS. 1-6, wherein like numbers indicate the same or corresponding elements throughout the drawings.

The present invention provides systems and methods allowing an optical fiber to be drawn from an initial preform and transported along a nonlinear path. The phrase "bare optical fiber" as used herein means an optical fiber directly drawn from a preform and prior to applying a protective coating layer to its outer surface (e.g., prior to the bare optical fiber being coated with a polymeric based material). The present invention provides flexibility by allowing the optical fiber to be transported along nonlinear pathways through stages of production prior to a protective coating being applied thereto. In addition, as discussed later herein, systems and methods of the invention not only provide nonlinear pathways, but can also assist in processing (e.g., cooling) of the optical fiber during production.

Referring to FIG. 1, an example of the system for producing optical fibers 8 is illustrated. In the embodiment shown in FIG. 1, a preform 10 is placed in a furnace 12 and fiber is drawn therefrom to create a bare optical fiber 14. Preform 10 may be constructed of any glass or material suitable for the manufacture of optical fibers. Once bare optical fiber 14 is drawn from a preform 10 and leaves furnace 12, the bare optical fiber 14 contacts a stationary fluid bearing 16 (discussed later herein) and shifts from moving along a substantially first or vertical pathway (A) to second pathway (B) before traveling to a cooling mechanism 18. As illustrated, second pathway (B) is oriented horizontally or orthogonal to the first path, but it should be understood that systems and methods described herein can redirect an optical fiber along any nonlinear pathway prior to a protective coating being applied thereto.

In the embodiment illustrated in FIG. 1, optical fiber 14 is cooled as it passes through the optional cooling mechanism 18 and prior to being subjected to a coating unit 20 where a primary protective coating layer 21 is applied to the outer surface of the bare optical fiber 14. Cooling mechanism 18 can be any mechanism known in the art for cooling optical fiber. Preferably, the cooling mechanism is filled with a gas that can facilitate cooling of the fiber at a rate faster than cooling in air. If desired, an optional additional fluid bearing 24 can be used to transport the bare optical fiber 14 from the substantially horizontal pathway (B) generated by the alignment of bearings 16 and 24 back to the substantially vertical pathway (A) (or any other third pathway) as it travels to the coating unit to receive the protective layer. After leaving the coating unit 20, the optical fiber with protective layer 21 (no longer being bare) can go through a variety of other processing stages within the system (not shown). Drawing mechanisms 28 are used to provide the necessary tension on the optical fiber as it is drawn throughout the entire system as shown in FIG. 1 and eventually wound onto a fiber storage spool (not shown).

As described later herein, the fluid bearings (e.g., 16 and 24), transport the optical fiber 14 through the optical fiber production system 8 such that the optical fiber does not receive any mechanical contact until the optical fiber reaches the drawing mechanisms 28. By mechanical contact, we mean contact with a solid component in the draw process. This lack of mechanical contact can be important to maintain the quality of the fragile bare optical fiber, especially one which travels through a nonlinear path prior to being coated by coating applicator 20. The mechanical contact provided by the drawing mechanisms 28 is acceptable because at that point in the system, the optical fiber has been coated with a protective layer 21, so that mechanical contact does not substantially affect the quality of the fiber in the same way as if the fiber was uncoated.

As discussed herein, providing an optical fiber production system having a nonlinear pathway prior to the coating step has many advantages. For example, in conventional production systems, adding new or additional components prior to the coating unit, such as an extra cooling mechanism 18 or an extra coating unit 20, meant that all such mechanisms would need to be rearranged linearly, often requiring an increase in height of the system. With the optical fiber production systems described herein, the optical fiber can be routed horizontally or diagonally (e.g. off vertical) prior to the protective coating being applied to allow more flexibility not only in set up of the equipment, but for later modifications, additions and updates.

Figure 2:
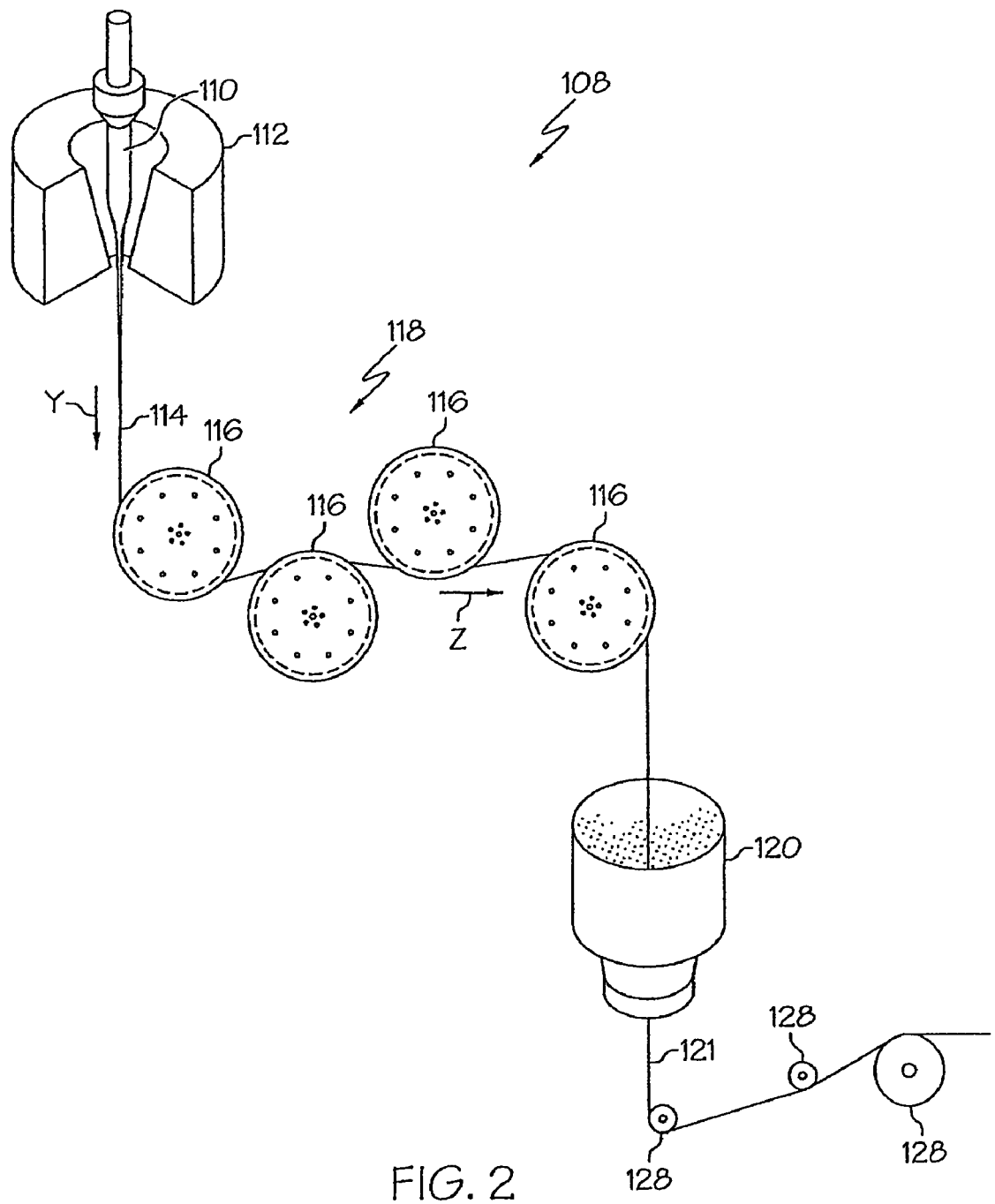
FIG. 2 illustrates an alternative optical fiber production system.

FIG. 2 illustrates another embodiment of an optical fiber production system 108. As shown in FIG. 2, a plurality of fluid bearings 116 can be used in combination to transport an optical fiber 114 from a preform 110 to a coating unit 120. Whereas the cooling mechanism 18 of FIG. 1 is provided after the optical fiber 14 has been formed from the preform 10 and before it reaches the coating unit 20 to have the protective layer 21 added to it, FIG. 2 provides an embodiment which eliminates the standard cooling mechanism. Particularly, in place of a standard cooling mechanism (e.g., 18 in FIG. 1), the fluid bearings 116 (or 14 or 24 in FIG. 1) can serve as a cooling mechanism 118 (as well as provide a region of fluid cushion over which the bare optical fiber 114 can travel). As the optical fiber 114 is transported over the fluid bearings 116 (described later herein), the region of fluid cushion on each fluid bearing 116 cools the bare optical fiber 114. For example, referring to FIG. 2, the optical fiber 114 exiting the furnace 112 can have a temperature of around 1000° C. -1800° C. or less as it enters the fluid bearings 116. In some preferred embodiments, the optical fiber enters the fluid bearings 116 at a point where the fiber temperature is less than 1300° C., more preferably less than 1200° C., and in some embodiments less than 1100° C. Because the fluid bearing employs a moving fluid stream which supports the optical fiber, the optical fiber is cooled at a rate which is faster than the fiber would cool in ambient non-moving air, such as is present immediately outside the draw furnace. The greater the temperature differential between the optical fiber and the fluid in the fluid bearing (which is preferably ambient or room temperature air), the greater the ability of the fluid bearing to cool the optical fiber 114. In another embodiment, the fluid emitted through the fluid bearings 116 can actually be cooled so as to cool the optical fiber at an even faster rate. The fluid associated with the region of fluid cushion can provide sufficient cooling to the optical fiber 114 so that it can be directly transported to the coating unit 120 and a protective layer can be applied to the outer surface of the bare optical fiber 114 to produce a coated fiber 121. In one embodiment, the region of fluid cushion of the fluid bearing 116 can include a fluid that is nonreactive relative to the bare optical fiber 114 (e.g., air, helium).

In addition to providing cooling, the arrangement of FIG. 2 utilizing multiple fluid bearings 116 can provide better stability when shifting the bare optical fiber 114 from a substantially linear arrangement (Y) to a substantially nonlinear arrangement (Y+Z). Without intending to be limited by theory, by having multiple fluid bearings 116 arranged adjacent to each other, the precision required to have the optical fiber 114 move from one region of fluid cushion to the next can be more easily controlled. Of course, it should be understood that any number of bearing assemblies (discussed later herein), including one bearing assembly, arranged in any order and to provide any number of desired pathways can be used to produce optical fibers.

Figure 3:
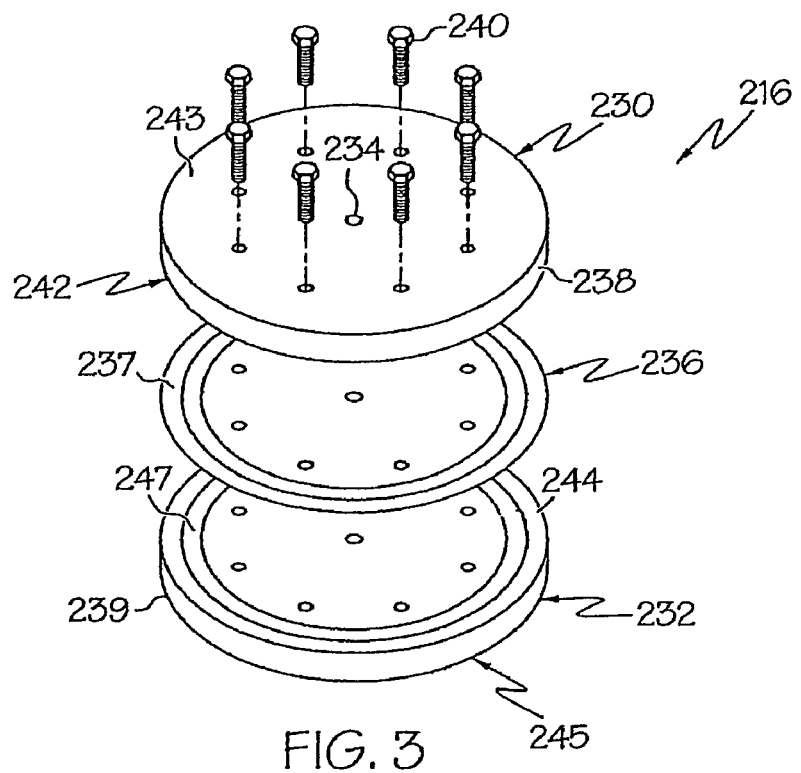
FIG. 3 illustrates an exploded view of a fluid bearing for use in an optical fiber production system.

Heretofore, systems and methods for producing optical fibers in nonlinear pathways have been described. As described herein, such systems and methods can include incorporation of one or more bearing assemblies. FIG. 3 illustrates an embodiment of a bearing assembly 216 that can be used for producing an optical fiber as described herein. In the embodiment shown in FIG. 3, the bearing assembly 216 (referred to sometimes as "fluid bearing") includes a first plate 230, a second plate 232, an inner member 236 and at least one opening 234 in at least one of the first and second plates. The first plate 230 and the second plate 232 can be made of metal and include an arcuate outer surface 238, 239 and can be positioned on opposite sides of each other. The first plate 230 and the second plate 232 are connected by fasteners (e.g., bolts 240) to link the plates 230, 232 together so that fluid may be passed through the bearing assembly 216. The arcuate outer surfaces 238, 239 of each plate 230, 232 generally lie along the circumference of each of the respective plates 230, 232. The first plate 230 and the second plate 232 each have respective inner 242, 244 and outer faces 243, 245, wherein the inner faces 242, 244 of the plates 230, 232 are aligned with each other. A recessed portion 247 extends at least partially around the inner faces 242, 244 of either the first plate 230 or the second plate 232 to provide a plenum for fluid flow. In another embodiment, the recessed portion may comprise a variety of configurations to provide uniform flow into fiber support channel 250, as discussed later herein.

In the embodiment illustrated, the arcuate outer surfaces 238, 239 of the first plate 230 and the second plate 232 are preferably substantially aligned and form a region between the outer surfaces 238, 239 of both the first plate 230 and the second plate 232. This region is configured to receive an optical fiber so that optical fiber can travel along this region without rotation of the bearing assembly. This fiber support channel 250 is more clearly illustrated in the embodiment shown in FIG. 4 (discussed later herein). At least one opening 234 passes through at least one of the first plate 230 and the second plate 232. As shown in FIG. 3, the opening 234 of the first plate 230 and the second plate 232 allow for fluid (e.g., air, helium or other desired gas or liquid) to be fed through the bearing assembly 216 so that the fluid can exit the bearing assembly 216 at the fiber support channel 250 which is formed between the first plate 230 and the second plate 232 (more clearly seen in FIGS. 4 and 5).

In addition, as shown in the embodiment of FIG. 3, the bearing assembly 216 can include an inner member 236 positioned between the first plate 230 and the second plate 232. This inner member 236 (e.g., a shim 237) is configured to aid in directing the fluid to the region between the outer surfaces 238, 239 of the first plate 230 and the second plate 232 such that the fluid exits the fiber support channel 250 having a predetermined flow direction. The inner member 236 rests between the first plate 230 and second plate 232 to provide a gap there between. The inner member 236 directs the fluid such that it exits the fiber support channel 250 having a predetermined flow direction. If desired, inner member 236 can comprise a plurality of fingers (not shown) to further control fluid flow by suppressing non-radial flow. In addition, the inner member 236 serves as a sealing portion to provide substantial contact between the first plate 230 and the second plate 232. Inner member may also include notches to facilitate entry and exit of the optical fiber, such as that illustrated in FIG. 6 (described later herein).

Figure 4:
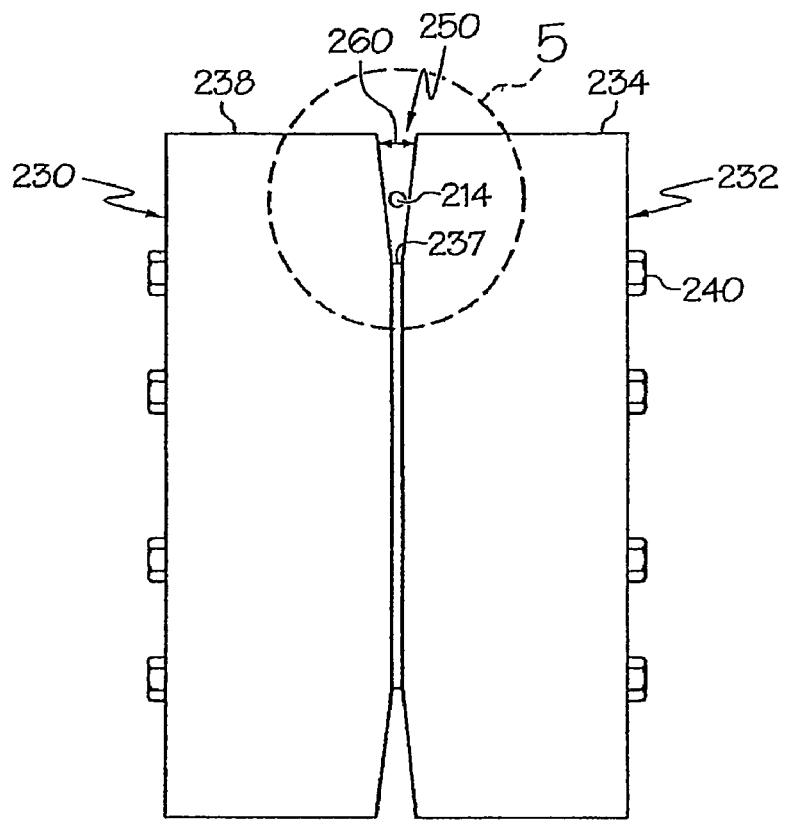
FIG. 4 illustrates a side plan view of a fluid bearing having a tapered region for an optical fiber production system.

As shown in FIG. 4, the fiber support channel 250 formed between the outer surfaces 238, 239 of the first plate 230 and the second plate 232 can be tapered where the fluid exits between the first plate 230 and the second plate 232. In another embodiment however, fiber support channel 250 can include a parallel or reverse tapered shape, for example. In addition, the opening 260 within the tapered fiber support channel 250 is variable depending on where the optical fiber 214 is vertically positioned. Preferably, the opening 260 and the fiber support channel 250 is configured so that, for the particular draw tensions and draw speeds employed and flow rates of the fluid through the opening 260, the optical fiber is maintained in a section of fiber support channel 250 which is less than 500, more preferably less than 400, even more preferably 300, and most preferably less than 200 microns wide, for a fiber having a typical outer diameter of 125 microns. Thus, the fiber is preferably retained within a region of the channel 250 which is between 1 and 2 times the diameter of the fiber, more preferably between 1 and 1.75 times the diameter of the fiber, and most preferably between 1 and 1.5 times the diameter of the fiber. Preferably, the fiber is located within a region of said channel such that the distance between the outer fiber and each wall is between 0.05 and 0.5 times the fiber diameter.

Figure 5:
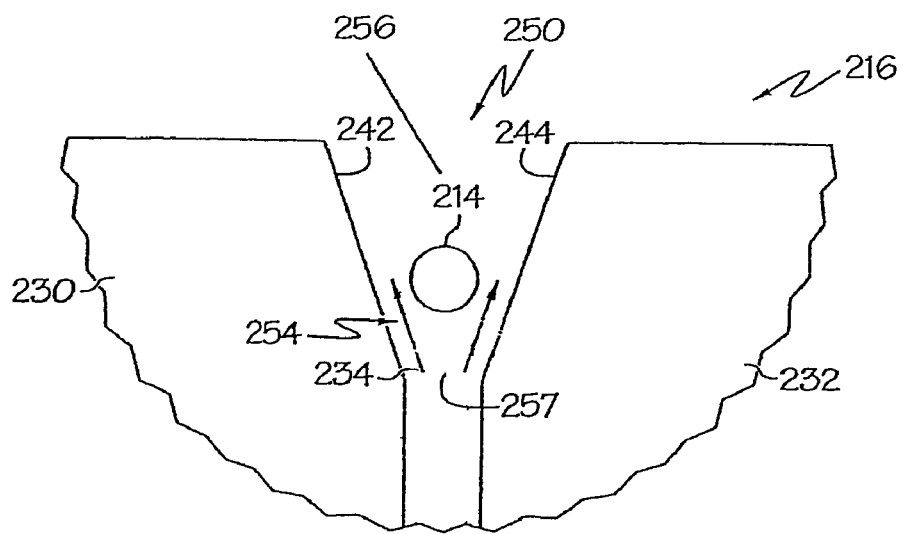
FIG. 5 illustrates an enlarged view of a portion of FIG. 4 of a region of a fluid bearing.

Referring to FIG. 5, the lengths of the surfaces 242 and 244 which form fiber support channel 250 are preferably at least 0.5 cm, more preferably at least 1 cm in length. In one embodiment, for example, the fiber support channel 250 may have a depth of 1.25 cm. For a 125 μm fiber, the distance across fiber support channel 250 may be, for example, approximately 127 microns at the innermost and narrowest section between plates 230 and 232 and approximately 380 microns at the outermost and widest section between plates 230 and 232 (slightly inside of the arcuate outer surfaces 238, 239).

FIG. 5 is an enlarged view of a portion of FIG. 4 which more clearly shows the fiber support channel 250 having a region of fluid 254 that contacts the optical fiber 214 as it is transported across the fluid bearing assembly 216 and prevents substantial contact of the optical fiber with the mechanical components of the fluid bearing assembly 216. As depicted in FIG. 5, fluid 254 (e.g. air) exits the fiber support channel 250 from within the bearing assembly 216 and around optical fiber 214 and provides the region of fluid 254 beneath the optical fiber 214 which results in a positive pressure below the fiber and thus acting on and supporting the bottom of the fiber. Pressure can be optimized so that the fiber 214 is positioned within the fiber support channel 250 formed between the first plate 230 and the second plate 232 of the fluid bearing assembly 216. Particularly, the fluid 254 exiting the bearing assembly 216 at fiber support channel 250 (i.e., beneath fiber 214) can have a constant fluid flow rate which can maintain or support the optical fiber 214 at a certain position within this fiber support channel 250. A high enough fluid pressure is provided to fiber support channel 250 to support the optical fiber 214 and maintain the optical fiber at a desired location within the fiber support channel 250 as the optical fiber 214 moves through the fluid bearing assembly 216.

As can be seen in FIG. 5, in some preferred embodiments, the surfaces 242 and 244 are preferably tapered or inclined so that the fiber support channel 250 comprises a narrower width at the end where the fluid flow 254 enters the fiber support channel 250 (i.e., inside the arcuate path formed by fiber 214 as it passes through the fluid bearing). In the embodiment illustrated, for ease of viewing, the tapered angle has been exaggerated in the illustration from what is a preferred angle of taper opening to fiber support channel 250. In reality, at least one of and preferably both of the surfaces 242 and 244 are each inclined, preferably at an angle greater than 0 and less than 10 degrees, more preferably between 0.3 and 7 degrees, and most preferably between 0.4 and 3 degrees, so that the width 260 of the top or outer portion 256 of fiber support channel 250 is wider than the width 260 of the bottom or inner portion 257 of fiber support channel 250. For example, in such an embodiment, the first plate 230 and the second plate 232 forming the region may be inclined at an angle of −0.6° and +0.6°, respectively. Alternatively, fiber support channel 250 may comprise any depth, width or tapered angle. By utilizing a tapered fiber support channel 250 (as shown, for example, in FIGS. 4 and 5) and injecting the fluid into the slot formed by fiber support channel 250 so that the fluid enters the narrower inner portion of fiber support channel 250 and exits the wider outer region of fiber support channel 250, the cushion of fluid emitted through channel 250 will cause the fiber to be self locating within the depth of the channel 250. For example, for a given fluid flow, if the fiber draw tension is increased, the fiber will move downward in the channel 250 until the gaps between the fiber 214 and channel walls 242 and 244 are small enough that the pressure in channel 250 is high enough to correctly counteract the new higher tension. If the fiber draw tension is decreased, the fiber will move upwardly within the channel 250 until the gaps between fiber 214 and channel walls 242 and 244 are large enough that the pressure in channel 250 is small enough to correctly counteract the new, lower tension. Tapering the channel 250 thus enables the channel 250 to work with a wider range of draw tensions. Otherwise, if channel 250 as shown was not tapered and the draw tension was decreased, the fiber would travel upward and out of fiber support channel 250.

Preferably, the fiber is located in an area of the channel 250 that is between about 1 and 2 times the fiber diameter, more preferably between about 1 and 1.75 times the fiber diameter, most preferably between about 1 and 1.5 times the fiber diameter. By locating the fiber in such a relatively narrow region in channel 250, the fiber will center itself during operation due to the Bernoulli effect. For example as the fiber gets closer to surface 244 and further away from surface 242, the velocity of the air will increase nearest surface 242 and decrease nearest surface 244. According to the Bernoulli effect, an increase in fluid velocity occurs simultaneously with a decrease in pressure. As a result, the greater pressure caused by the decreased fluid flow near surface 244 will force the fiber back into the center of channel 250. Thus, in the preferred embodiments, the fiber is centered within the fiber support channel 250 at least substantially via the Bernoulli effect due to a fluid stream which is passing around the fiber and out of the fiber support channel 250 while the fiber is being drawn. Notably, such centering occurs without having to utilize any flow of fluid which would impinge upon the fiber from the side thereof, e.g., there are no jets of fluid flow employed which emanate from sidewalls 242 or 244. The velocity of the fluid stream traveling through the slot is preferably adjusted to maintain the fiber so that the fiber is located entirely within a tapered region of the slot 250. In the presently described embodiment, because the fiber is located in an area of the channel 250 that is between about 1 and 2 times the fiber diameter, the fiber is supported by a pressure difference that exists below the fiber 214 (rather and as opposed to aerodynamic drag which might also be used to support a fiber, if one so chose). By supporting or levitating the fiber within channel 250 via a fluid pressure differential, much lower fluid flows can be employed than if aerodynamic drag was used to levitate the fiber.

In the embodiment illustrated, the fluid stream is preferably provided by a single fluid stream which enters fiber support channel 250 via the narrower inner portion of fiber support channel 250 and exits via the wider outer region of fiber support channel 250. In this way, the fiber can be positioned entirely within the slot formed by fiber support channel 250 such that the fiber floats between the narrowest and widest portion of the slot. By employing a tapered fiber support channel 250 and injecting the fluid flow through the region 250 in this manner, it is possible to retain the fiber in a region of said slot formed by fiber support channel 250 wherein the slot has a width which is between 10 to 150, more preferably 15 and 100, and most preferably between about 24-70 microns greater than the diameter of the fiber being directed through the fiber support channel 250. During the fiber draw process, the fiber is also preferably retained within a region of the channel such that the distance between the outer fiber and each wall is between 0.05 and 0.5 times the fiber diameter.

In some preferred embodiments, fiber support channel 250 is provided with a means for reducing pressure under the fiber as the fiber moves outwardly away from the source of the fluid flow. Such a means for releasing pressure can be achieved in the form of a tapered channel design, as described above. Alternatively, as illustrated in FIG. 7, one or more slots 270 can be located in one or both of the walls 242, 244 which form the channel 250, the slots 270 extending radially from the inlet to the outlet of channel 250, particularly in the region of the channel where the fiber is meant to be located during the fiber draw operation (i.e., where the fiber passes through the air bearing). Because fluid will flow out of the slots and thus out of channel 250 when it comes in contact with the slotted channels, for any given fluid pressure exerted into the channel 250, there will be less fluid pressure to support the optical fiber the higher the channel 250 the fiber is located. With the fiber in a higher position, the area of the slots in channel 250 which are below the fiber will be larger. Conversely, when the fiber is in a lower position, the area of the slots which are below the fiber will be smaller. Consequently, as the draw tension on the optical fiber is decreased, the fiber can still be retained within the channel 250 even if the sidewalls forming the channel are perfectly parallel to one another, because as the fiber moves up or outward within the channel, more fluid escapes through the slots thereby reducing the pressure differential beneath the fiber, thereby causing the fiber to cease moving upward in the channel. Of course, the invention is not limited to using slots to reduce the pressure, and other means for reducing pressure, for example small holes arranged in series and extending radially outward on the surfaces 242, 244, could also be employed.

In other preferred embodiments, as illustrated in FIG. 8, the means for releasing pressure as the fiber moves outwardly in the channel 250 away from the source of the fluid flow may be provided by a porous material 272 which allows fluid to escape through the sidewall surfaces 242, 244 of the channel 250. Such a means for releasing pressure can be achieved in the form of a porous metal media such as is formed by sintering of beds of metals so that porosity is trapped in the metal during the sintering process. Such porous metal media is available, for example, from Applied Porous Technologies, Tariffville, Conn., USA. Because fluid will flow out of the channel through the porous material 272, there will be less fluid flow through channel 250 and thus less fluid pressure to support the optical fiber 214 the higher the fiber is positioned within channel 250. Consequently, as the draw tension on the optical fiber is decreased, the fiber can still be retained within the channel 250 even if the sidewalls forming the channel are perfectly parallel to one another, because as the fiber moves up or outward within the channel, fluid escapes through the porous metal, thereby reducing the pressure differential beneath the fiber, thereby causing the fiber to cease moving upwardly in the channel.

The fluid bearings described herein enable the optical fiber to travel along the region of fluid cushion so as to prevent or substantially prevent actual mechanical contact between the optical fiber and the bearing assembly 216, e.g., the fiber travels within fiber support channel 250 without contacting either of plates 230 or 232. In addition, because of the size and configuration of the region, the fluid bearing is capable of maintaining the fiber within the region without mechanical contact through a range of draw tensions without active control of the fluid flow.

Referring to FIG. 5, the fluid flow can be important to prevent the optical fiber 214 from moving towards the bottom 257 of the fiber support channel 250 and coming in contact with the shim 237 or the sides of the fiber support channel 250 (the inner faces 242, 244). This is particularly important when the optical fiber is still bare so that the fiber quality is not compromised by the mechanical contact with the bearing assembly 216. Moreover, it is believed the closer the optical fiber 214 is positioned relative to the bottom 257 of the fiber support channel 250, the higher the pressure needs to be within the fiber support channel 250 to maintain the optical fiber 214 at the desired location. As is evident, the taper in channel sides 242 and 244 will cause the gaps between the channel sides and the fiber to be smaller, causing this necessary higher pressure. Other factors influencing fiber position within fiber support channel 250 include the draw tension. For example, fiber pulled with 200 g of tension will float lower within fiber support channel 250 than fiber pulled with a tension of 100 g given the same fluid flow. As such, it is important that the fluid exiting the region of the fluid bearing be sufficient to maintain the optical fiber at the desired location for the particular fiber draw speed and draw tension employed. For example, in the embodiment described above which utilizes a fiber support channel 250 having a width of about 127 microns at the innermost section between plates 230 and 232 and approximately 380 microns at the outermost section, the fluid flow rate can be from about 0.5 L/sec to more than 5 L/sec. Such a configuration and fluid flow can result in local fluid velocities around the optical fiber as high as 800 km/hour or even higher. Thus, in some embodiments the maximum fluid velocities around the fiber employed in the fiber support channel 250 are higher than 100, higher than 200, higher than 400, and possibly even higher than 600 km/hour. In some embodiments, maximum fluid velocities around the fiber employed in the fiber support channel 250 have been higher than 900 km/hour. For example, applicants have successfully employed 1000 km/hour fluid flow around the fiber in the fiber support channel 250. However, the methods disclosed herein are certainly not limited to these fluid velocities, and in fact the fluid velocity preferably can be chosen to result in the fiber being located at a desired location within fiber support channel 250, depending on draw conditions (e.g. draw speed, draw tension, etc.) and fluid bearing design. In another embodiment, the fluid flow rate can be from about 3 L/sec to about 4 L/sec. Of course, any fluid rate sufficient to maintain the optical fiber at the desired location at a given draw tension can be utilized. The use of such high fluid flow velocities can greatly facilitate cooling of the optical fiber. The larger the difference between the temperature of the fiber and the temperature of the fluid being emitted through the fluid bearing, and the higher the fluid flow velocity, the greater the amount of cooling that can be achieved. In some embodiments, the temperature of the fiber entering the fluid bearing can be greater than 100° C., greater than 500° C., greater than 1000° C., and even greater than 1500° C. higher than the temperature of the fluid being emitted through and supporting the fiber within the fluid bearing. Employing such temperature differentials in the embodiment discussed above (i.e., employing a fluid bearing having a fiber support channel 250 having a width of about 127 microns at the innermost section, about 380 microns at the outermost section, having a fluid bearing radius (and thus a fiber turn radius) of about 8 cm (3 inches), fluid flow rates from about 0.5 L/sec to about 5 L/sec or higher), with an optical fiber draw speed of greater than 20 meters per second, a fiber having a temperature upon entry into the fluid bearing of 1100° C. may be cooled as much as 1000° C., i.e., to about 100° C. using a room temperature (i.e., about 20° C.) fluid (preferably air) by passing the fiber through the fluid bearing to make the fiber achieve a 180 degree turn in direction. This very significant amount of cooling illustrates the capability of using fluid bearings such as are disclosed herein to cool the fiber greater than 50° C., 200° C., 500° C., 700° C., and even greater than 900° C. Perhaps even more significant is that such fiber cooling amounts can be achieved over fiber distance (i.e. the circumferential distance over which the fiber is exposed to the fluid cushion of the fluid bearing) of less than 3, more preferably less than 2, and most preferably less than 1 meter. However, greater or lesser distances of fiber/fluid cushion contact can be employed, depending on desired results and the layout of the manufacturing area. The significant cooling capability of the fluid bearings disclosed herein enables the potential elimination of helium cooling devices from the optical fiber draw process altogether.

The radius of the fluid bearings 16, 24, 116, 216, 316 is not critical. In some embodiments, fluid bearing is constructed to result in a fiber turn radius of from about 8 to 16 cm. Larger or smaller radius fluid bearings can be employed, or additional fluid bearings can be employed (such as is illustrated in FIG. 2) for example depending on whether greater cooling is desired (in which case larger radius fluid bearing may be preferred) or the constraints of the fiber draw process.

Figure 6:
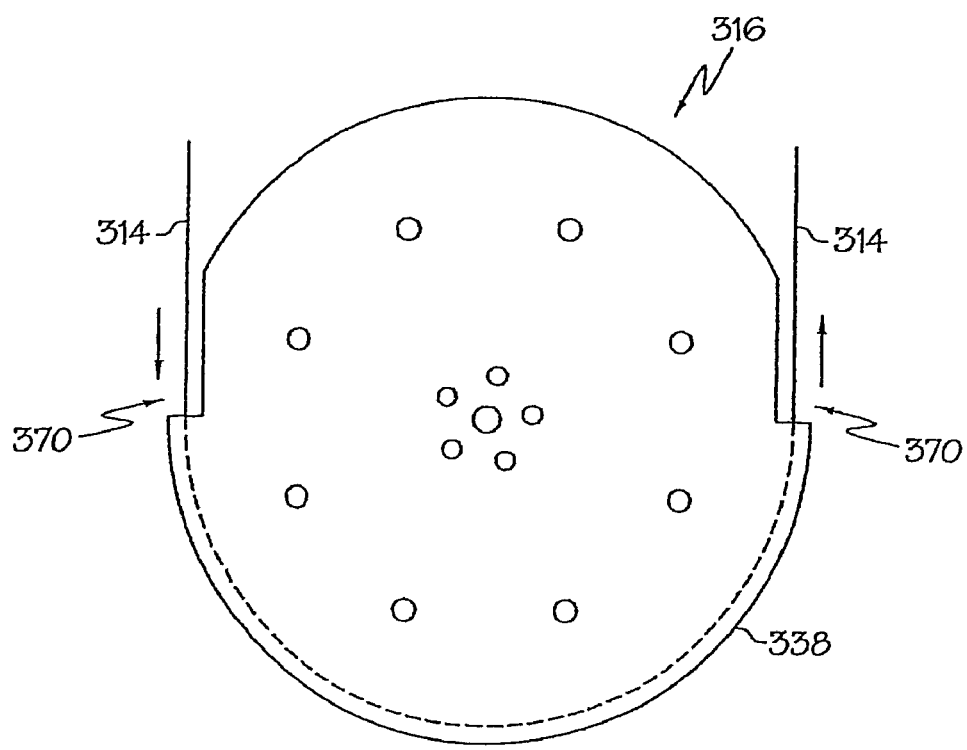
FIG. 6 depicts a front plan view of a portion of a fluid bearing.

In another embodiment as shown in FIG. 6, the fluid bearing 316 can have one or more notched portions 370 associated with an arcuate outer surface 338 of a first plate and second plate (not shown). In another embodiment, as previously discussed, the structure of FIG. 6 can be incorporated as a separate inner member as described with respect to FIG. 3. Still referring to FIG. 6, the corresponding notched portions 370 on each plate can allow for a more controlled entry and/or exit of the optical fiber 314. Particularly, as the optical fiber 314 enters the fluid bearing, it passes between the first plate and the second plate (as earlier seen in the embodiments of FIGS. 4 and 5). At the exit from the bearing, the fiber can be subjected to oscillating forces which could be caused by a number of reasons, causing the optical fiber to come into mechanical contact with the first plate or the second plate in the region. The notched portions 370 on the plate(s) (or separate inner member) minimize or eliminate the transition force acting on the optical fiber as it enters or exits the region by allowing the optical fiber to directly enter and/or exit the portion of the region of fluid cushion, thus generally bypassing the oscillating hydrodynamic force. As shown in the embodiment of FIG. 6, there can be two corresponding notched portions 370 associated with the first plate and the second plate (not shown) (or inner member), one corresponding notched portion to provide entry for the optical fiber and one to provide exit for the optical fiber. As previously discussed, the inner member 236 of FIG. 3 can be configured with the notches of FIG. 6 to provide for similar capabilities. Of course, any design or arrangement of the plate(s) and/or inner member which can minimize or eliminate the transition force exerted on the optical fiber can be used.

As such, the bearing assemblies described herein are capable of many functions including providing a nonlinear path for production of optical fibers. In this regard, bearing assemblies can be used in any combination with the methods of transporting optical fiber as previously discussed herein. In addition, it should be understood that the embodiments of the fluid bearings as discussed and illustrated herein can be used at any stage during the production of the optical fiber. By enabling a nonlinear path prior to the coating applicator, the bearing assemblies and the optical fiber production systems incorporating these bearing assemblies are extremely flexible in that components can be easily manipulated and interchanged within the optical fiber production systems while providing systems that utilize less space as compared with conventional draw towers.

As discussed herein, other advantageous functions of the bearing assemblies and the optical fiber production systems incorporating such bearing assemblies include novel systems and methods for cooling the optical fiber thereby eliminating additional cooling mechanisms and components and further enhancing the flexibility of such systems. Accordingly, the optical fiber production systems incorporating fluid bearings and methods of producing the optical fibers described herein provide many advantages over conventional systems and methods.

Example 1—An approximately 125 micron diameter optical fiber was drawn from an optical fiber perform, using a conventional fiber draw process operating at a draw speed of 20 msec. with a draw tension of about 200 grams. The bare uncoated fiber was made to undergo a 180 change in direction by directing the fiber through a fluid bearing in accordance with the invention. The fluid bearing utilized was of the type illustrated in FIGS. 3-5 and exhibited a fiber support channel 250 having a width of about 127 microns at the innermost section, about 380 microns at the outermost section, having a fluid bearing radius (and thus a fiber turn radius) of about 13 cm (5 inches). The fluid bearing was situated so that the entry temperature of the fiber into the fluid bearing was about 1100 C. Room temperature (i.e., about 24 C) air was emitted through the fluid bearing. The maximum velocity of the fluid at the region surrounding the optical fiber in fiber support channel 250 was about 1000 km/hour. The temperature of the fiber at the exit point of the fluid bearing was about 500 C, thus demonstrating the significant cooling capability of the invention. The fiber path was successfully turned 180 degrees without damaging the optical fiber.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for producing an optical fiber, said method comprising:
   drawing a bare optical fiber from a preform along a first pathway;
   contacting said bare optical fiber with a region of fluid in a fluid bearing, said fluid bearing comprising a channel, said channel defined by at least two sidewalls, the fiber being retained between said two sidewalls during said drawing step, said two sidewalls defining an inlet below said fiber, said fiber positioned more than a fiber diameter from said inlet, causing said fiber to be levitated within the channel substantially as a result of a pressure differential which is present below the fiber within the channel, said pressure differential caused by a higher pressure caused by said fluid being supplied below the fiber within the channel compared to the pressure which is present above the fiber, and
   redirecting said bare optical fiber along a second pathway as said bare optical fiber is drawn across said region of fluid cushion.

2. The method of claim 1, wherein said channel is provided with a means for allowing differential pressure to reduce as the distance between the fiber and high pressure fluid source increases.

3. The method of claim 2, wherein said means for allowing pressure to reduce comprises openings in said sidewall to allow fluid to escape from the channel through the sidewalls.

4. The method of claim 3, wherein during said drawing step said fiber is retained within a region of said channel having a width which is between 1 and 2 times the diameter of the fiber.

5. The method of claim 2, wherein said means for allowing pressure to reduce comprises a porous metal which allows fluid to escape from the channel through the sidewalls.

6. The method of claim 1, wherein said channel has a fluid inlet region and a fluid outlet region, and said sidewalls so that they are tapered with respect to one another so that the fluid inlet region is narrower than the fluid outlet region of said channel.

7. The method of claim 6, wherein during said drawing step said fiber is retained within said channel wherein at least one of the sidewalls which make up said channel is angled at greater than 0 degrees and less than 10 degrees with respect to the other sidewall.

8. The method of claim 1, wherein said fiber is self centering within said channel due at least substantially to the Bernoulli effect.

9. The method as recited in claim 1, wherein the channel includes a fluid inlet and a fluid outlet region, and the channel is tapered so that the width of the channel at the fluid inlet is less than the width of the channel at the fluid outlet, so that the position of the fiber is self locating within the channel.

10. The method of claim 1, wherein said fiber is retained substantially within the channel so that said fluid contacts said fiber substantially from a single direction as the fluid travels through the channel.

11. The method of claim 1, wherein said fiber rests on a region of said channel such that the distance between the outer fiber diameter and each wall is between 0.05 and 0.5 times the fiber diameter.

12. A method for producing an optical fiber, said method comprising:
drawing an optical fiber along a first pathway and simultaneous with said drawing;
contacting said optical fiber with a region of a fluid bearing, wherein said fluid bearing comprises a first plate and a second plate, the first and second plates each having an arcuate outer surface, the plates combining to form a channel region, wherein said channel is tapered at an angle, and wherein each of the plates having a notched portion associated with the arcuate outer surfaces and fluid flows into said channel through a fluid inlet and out of the channel through a fluid outlet, to thereby support said fiber within said channel region during said drawing step, the narrower portion of the channel configured to receive fluid to be transported through said channel, thereby creating high pressure on the fluid inlet side of the channel with respect to the pressure on the fluid outlet side of the channel and thereby cushion and deliver said fiber in an arcuate path through said fluid bearing; and
redirecting said optical fiber through said arcuate path and along a second pathway as said optical fiber is drawn through said fluid bearing.

13. The method of claim 12, wherein at least one of the walls which forms said channel is angled greater than 0 and less than or equal to 10 degrees from being parallel with the other wall which forms said channel.

14. The method of claim 13, wherein during said drawing step said fiber is retained within a region of said channel such that the distance between the fiber and each wall is between 0.05 and 0.5 times the fiber diameter.

15. The method of claim 12, wherein said fiber is retained substantially within the channel during said drawing step so that said cushion of fluid contacts said fiber substantially from a single direction as the fluid travels through the channel.

16. The method of claim 12, further comprising cooling said optical fiber via said contact with said flow of fluid through the channel, said cooling occurring at a rate faster than cooling in ambient air.

17. The method of claim 12, further comprising coating said optical fiber after said contacting said optical fiber with a region of a fluid bearing.

18. A method for producing an optical fiber, said method comprising:
drawing a bare optical fiber from a preform along a first pathway and simultaneous with said drawing;
contacting said bare optical fiber with a fluid within a channel, said channel defined by two sidewalls, wherein at least one of the walls which forms said channel is angled greater than 0 and less than or equal to 10 degrees with respect to the other wall which forms said channel, the fluid pressure for said fluid being selected and the fiber being retained within a region of said channel between said two sidewalls having a width, the pressure and the width sufficient to cause said fiber to be centered within the channel at least substantially as a result of the Bernoulli effect.

19. The method of claim 18, wherein during said drawing step said fiber is retained within a region of said channel such that the distance between the outer fiber and each wall is between 0.05 and 0.5 times the fiber diameter.

20. The method of claim 18, wherein as the fiber gets further away from the sidewall, the velocity of the air will increase near that sidewall, thereby decreasing pressure near said sidewall that forces the fiber back into the center of the channel.

21. A method for producing an optical fiber, said method comprising:
drawing an optical fiber along a first pathway and simultaneous with said drawing;
contacting said optical fiber with a region of a fluid bearing, wherein said fluid bearing comprises a first and second sidewall which combine to form a channel, wherein at least one of the sidewalls which forms said channel is angled greater than 0 and less than or equal to 10 degrees from being parallel with the other wall which forms said channel, and fluid flows into said channel through a fluid inlet region and out through a fluid outlet region, to thereby support said fiber within said channel region during said drawing step, the fluid inlet region of said channel, being narrower than the fluid outlet region of said channel, thereby creating high pressure on the fluid inlet region of the channel with respect to the pressure on the fluid outlet region of the channel and thereby cushion and deliver said fiber in an arcuate path through said fluid bearing; and
redirecting said optical fiber through said arcuate path and along a second pathway as said optical fiber is drawn through said fluid bearing.

* * * * *